June 15, 1926.

J. P. WALKER 1,588,861

GAS TRAP AND FLOW TANK

Filed July 17, 1925

3 Sheets-Sheet 1

Inventor
J. P. Walker

By

Attorney

June 15, 1926.
J. P. WALKER
GAS TRAP AND FLOW TANK
Filed July 17, 1925   3 Sheets-Sheet 2
1,588,861
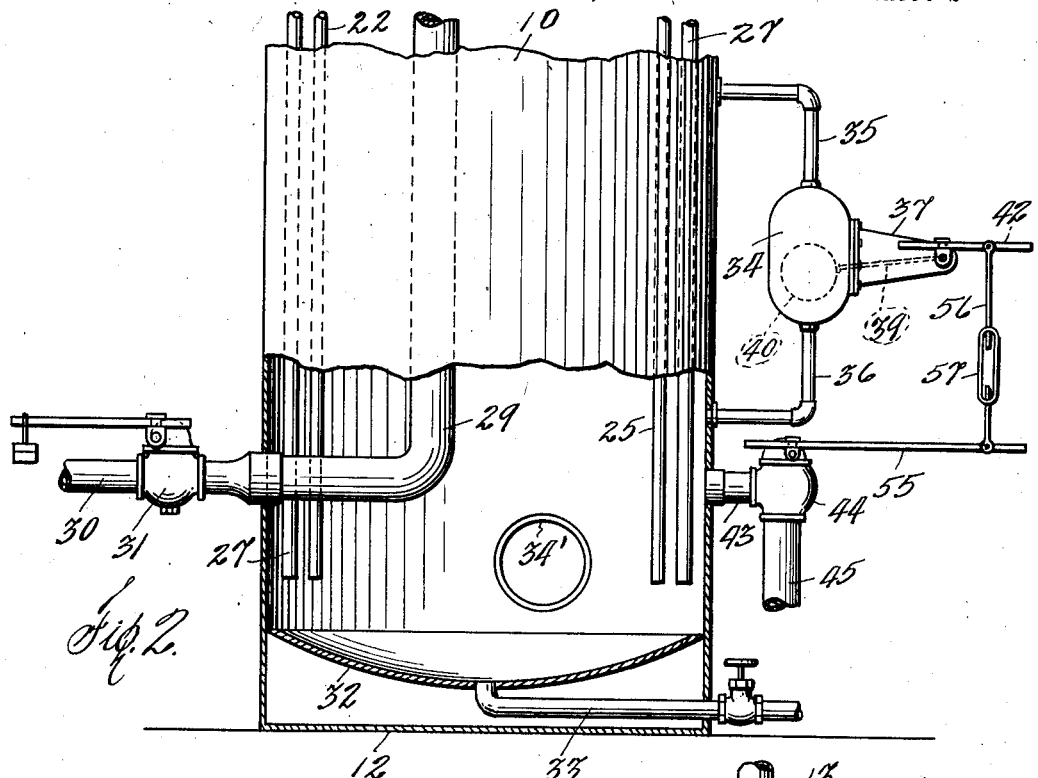
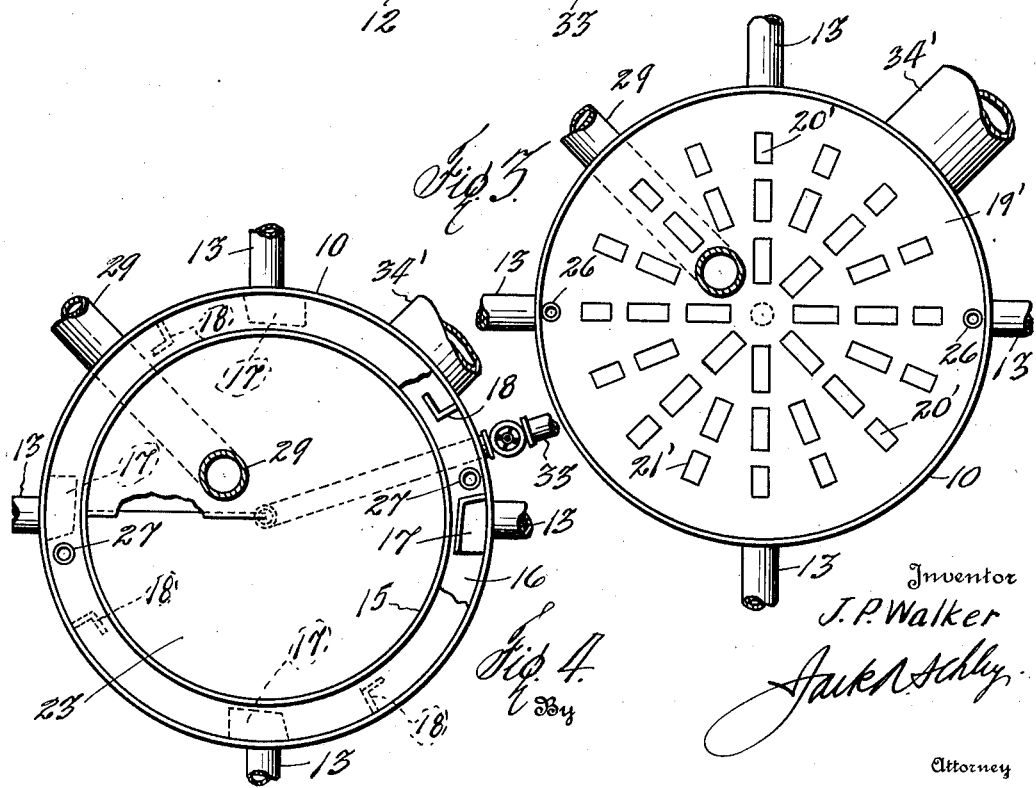

June 15, 1926.

J. P. WALKER

GAS TRAP AND FLOW TANK

Filed July 17, 1925

1,588,861

3 Sheets-Sheet 3

Inventor
J. P. Walker

By Jack A. Schley

Attorney

Patented June 15, 1926.

1,588,861

UNITED STATES PATENT OFFICE.

JAY P. WALKER, OF OKLAHOMA CITY, OKLAHOMA, ASSIGNOR TO AMERICAN TANK COMPANY, OF OKLAHOMA CITY, OKLAHOMA, A CORPORATION OF OKLAHOMA.

GAS TRAP AND FLOW TANK.

Application filed July 17, 1925. Serial No. 44,248.

This invention relates to new and useful improvements in gas traps and flow tanks.

The object of the invention is to provide a tank for receiving oil and gas from a flowing or pumped well and thoroughly separating the oil from the gas in an expeditious and efficient manner.

A further object of the invention is to provide means for automatically discharging both the oil and the gas and at the same time maintaining a predetermined pressure in the tank.

Another object of the invention is to provide a plurality of baffles so arranged as to effect a maximum separation of the oil from the gas.

Still another object of the invention is to provide individual oil drains for certain of the baffles for conducting separated oil to the oil compartment without mixing it with inflowing oil and gas.

A further object of the invention is to provide means for initially robbing the inflowing fluid of oil, thus facilitating the separation by reducing the specific gravity of the flowing fluid.

Another object is to construct the fluid passages in the baffles so that the oil cannot flow back through the same.

A construction designed to carry out the invention will be hereinafter described together with other features of the invention.

Figure 1:
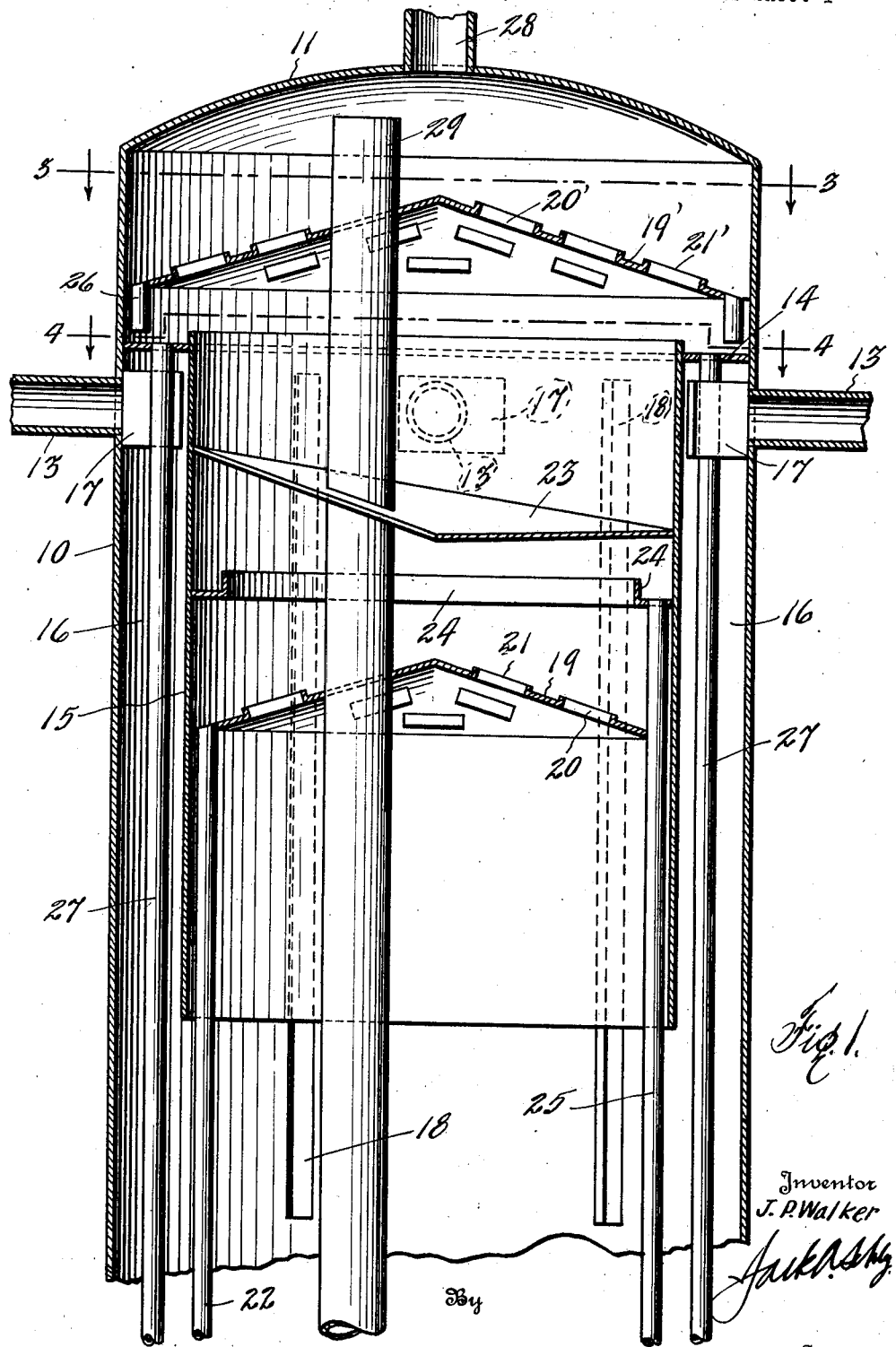
Figure 5:
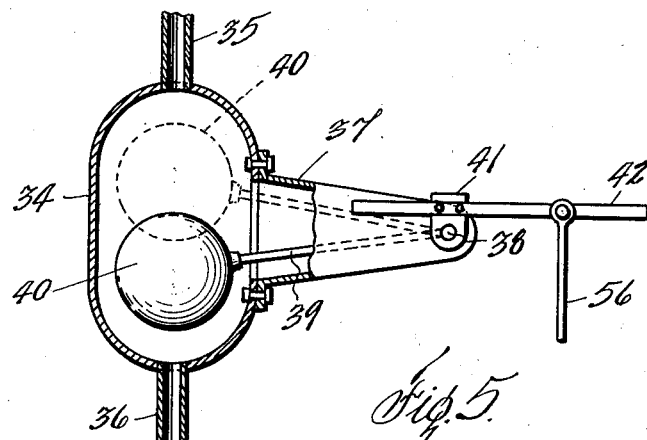
Figure 6:
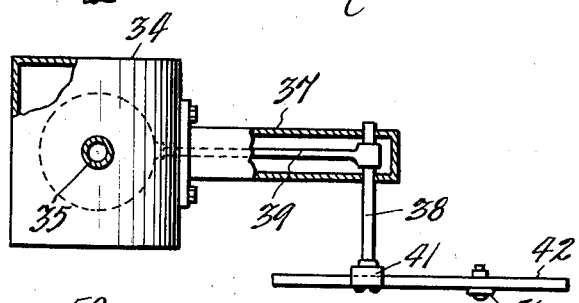
Figure 7:
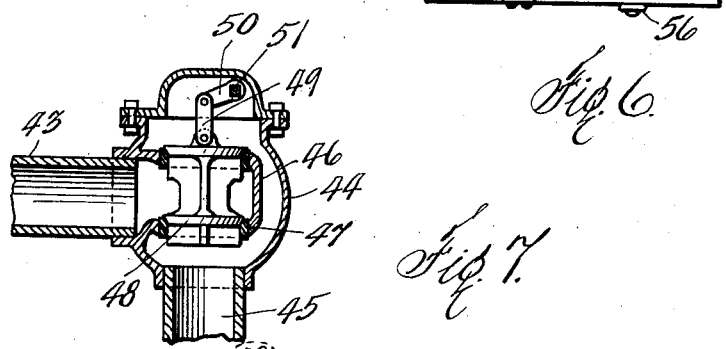
Figure 8:
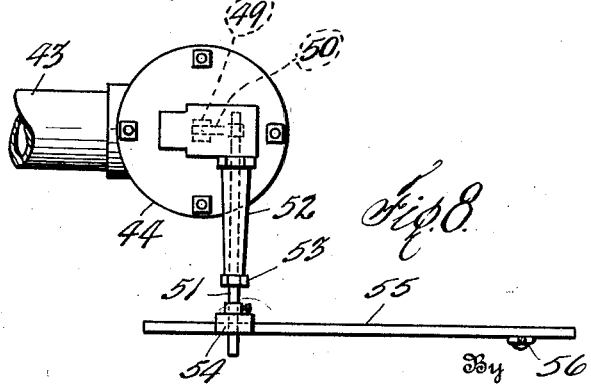

The invention will be more readily understood from a reading of the following specification and by reference to the accompanying drawings, in which an example of the invention is shown, and wherein:

Fig. 1 is an enlarged vertical sectional view of the upper portion of a tank constructed in accordance with my invention, Fig. 2 is a vertical sectional view of the lower portion of said tank, Fig. 3 is a reduced cross-sectional view on the line 3—3 of Fig. 1, Fig. 4 is a reduced cross-sectional view taken on the line 4—4 of Fig. 2, Fig. 5 is an enlarged vertical sectional view of float operating means for the oil release valve, Fig. 6 is a plan view of the same, Fig. 7 is a vertical sectional view of the release valve, and Fig. 8 is a plan view of the release valve.

In the drawings the numeral 10 designates an upright cylindrical metal tank having a crowned top 11 and a flat bottom 12, the shape and material however being subject to variation. A short distance below the top, fluid inlet pipes 13 enter the sides of the tank at equi-distant points. A flat circular partition 14 is secured to the inner wall of the tank just above the inlets. A cylindrical jacket 15 open at both ends has its upper end engaging in the partition so as to extend slightly above the latter to form a circular trough surrounding the upper end of the jacket. This jacket is mounted concentrically in the tank and is surrounded by a restricted cylindrical space 16 closed at its upper end by the partition 14.

Each inlet pipe 13 discharges into a box 17 open at one end and directed clockwise (Fig. 4) in the space 16. The fluid composed of oil and gas is directed circumferential around the inner wall of the tank to which it is held by centrifugal force. In the path of the fluid and co-ordinated with the discharge end of the box is an oil deflector in the form of an angle member 18 secured to the wall of the tank and extending below the jacket. These deflectors catch the oil as an initial step and conduct it down into the compartment below the jacket. It will be seen that only a narrow passage is left between each deflector and the jacket, so that the inflowing fluid will be effectually robbed of oil at these points and thereby its specific gravity will be greatly reduced.

The inflowing fluid passes down the jacket and up into the same. The speed at which the fluid enters the tank will be somewhat checked by the deflects, but a certain portion will pass up into the jacket; while the oil will collect in the bottom portion of the tank. A conical baffle 19 is secured in the jacket just below its transverse center. The baffle has a plurality of triangular openings 20 disposed radially, although the shape and disposition are subject to variation. Each opening is provided with a surrounding flange 21 formed by welding or riveting or otherwise attaching or turning up a flange on the top of the baffle of sufficient height to keep the oil from flowing back down through the same triangular hole. Any oil passing through the openings is prevented passing back by the flanges and is carried down the inclined surface of the baffle from which it is conducted by a drain pipe 22 leading down to the oil compartment.

Above the transverse center of the jacket is secured a spiral baffle 23 which is inclined slightly upwardly from the center of the tank to the wall jacket. The oil laden gas strikes the baffle 23 and is deflected against the wall of the jacket while following the baffle. Oil separated from the gas falls into an annular trough 24 secured to the inner wall of the jacket and conducted therefrom by a drain pipe 25. The fluid passing above the baffle 23 strikes a second conical baffle 19' having openings 20' and flange guards 21'. This baffle is above the jacket and overhangs the trough. Short drain pipes 26 depend from the baffle 19' into the trough and drain pipes 27 lead down from the trough into the oil compartment below the jacket.

At the center of the tank is an auxiliary gas outlet 28 which is normally closed, but is used when an excessive volume of gas is passing through the tank. A vertical gas discharge pipe 29 extends from a point above the baffle 19' down through the baffles and jacket. Near the bottom of the tank the pipe 29 (Fig. 2) is bent at right angles and directed through the side wall of the tank. This pipe is connected to a gas discharge pipe 30 in which is connected a pressure regulator 31, of suitable construction and set to hold a predetermined pressure of fluid in the tank. The tank 10 has a disked false bottom 32 from which a drain pipe 33 leads. A clean-out manhole 34' is provided in the side wall just above the false bottom.

In order to maintain a pressure in the tank, an oil level and an automatic oil release are provided. In carrying out this feature an exterior float chamber 34 is provided. This chamber is supported by angular pipes 35 and 36 respectively, connecting the upper and lower ends of the chamber with the tank. The chamber has a boot 37 extending from one side and a horizontal rock shaft 38 (Figs. 5 and 6) passes through the outer end of the boot. An arm 39 fastened on the shaft within the boot extends into the chamber and carries a float 40 on its end. The shaft is rocked by the rise and fall of the float.

The shaft 38 has a clamp 41 secured on its outer end and a lever 42 is fastened in the clamp at substantially right angles to the shaft.

Below the pipe 36 an oil discharge nipple 43 extends horizontally from the tank and connects in the side of a valve 44 which has a discharge pipe 45 extending from its bottom. The valve (Fig. 7) has an interior gage 46 provided with superposed seats 47, relatively between which the oil enters from the nipple. A double valve 48 of the balance type engages upon the seats. The valve is lifted by a link 49 pivoted to a short crank arm 50 carried by a rock shaft 51 in the upper end of the valve housing. The valve housing has a tapered barrel 52, (Fig. 8) extending laterally from its top and housing the shaft 51 which projects through packing glands 53 at the end of the barrel. The shaft 51 is substantially parallel to the shaft 38 and carries a clamp 54 in which a lever 55 is fastened. The lever 42 overhangs the lever 55 and is pivoted thereby by a bridle link 56 including a turn-buckle 57 (Fig. 2). It will be seen that the lowermost position of the float 40 controls the oil level in the tank. When the oil rises and lifts the float the shaft 38 is rocked, whereby the valve 48 is lifted by the operation of the parts 49, 50, 51, 55, 56 and 42. This permits the oil to discharge through the parts 43, 47, 46 and 45 until the float falls to its normal position; whereupon the valve is closed.

Various changes in the size and shape of the different parts, as well as modifications and alterations may be made within the scope of the appended claims.

What I claim, is:

1. In an oil and gas separator, a vertical tank, fluid inlets in the sides of the tank above its central portion, a jacket within the tank spaced from the walls and top thereof, means having baffling surfaces extending vertically and transversely to the flow of the influent for extracting oil therefrom and located in the space between the jacket and the inner walls of the tank and directly in the path of the influent, baffles in the jacket for separating the oil from the gas, a gas outlet, and an oil outlet.

2. In an oil and gas separator, a vertical tank, fluid inlets in the sides of the tank above its central portion, a jacket within the tank spaced from the walls and top thereof, means having baffling surfaces extending vertically and transversely to the flow of the influent for extracting oil therefrom and located in the space between the jacket and the inner walls of the tank and directly in the path of the influent, baffles in the jacket for separating the oil from the gas, a gas outlet, an oil outlet, and means for draining the oil from the baffles.

3. In an oil and gas separator, a vertical tank, fluid inlets in the sides of the tank above its central portion, a jacket within the tank spaced from the walls and top thereof, means having baffling surfaces extending vertically and transversely to the flow of the influent for extracting oil therefrom and located in the space between the jacket and the inner walls of the tank and directly in the path of the influent, baffles in the jacket for separating the oil from the gas, a gas outlet, and means for draining the oil from the baffles, certain of the baffles having openings for upward passage of the fluid provided with means for preventing a reverse passage of the oil therethrough.

4. In an oil and gas separator, a vertical tank, fluid inlets in the sides of the tank above its central portion, a jacket within the tank spaced from the walls and top thereof, means having baffling surfaces extending vertically and transversely to the flow of the influent for extracting oil therefrom and located in the space between the jacket and the inner walls of the tank and directly in the path of the influent, baffles in the jacket for separating the oil from the gas, a gas conductor leading from a point above the jacket and from above the uppermost baffle to and through the lower portion of the tank, and an oil outlet for the tank.

5. In an oil and gas separator, a vertical tank, a jacket in the upper portion of the tank, there being a receiving space between the jacket and the tank sealed at its upper end, fluid inlets entering said space, means at the inlets for directing the influent circumferentially, vertical oil deflectors in said space directly in the path of said influent, means co-ordinated with said deflectors for conducting oil extracted by said deflectors to the lower portion of said tank, baffles in the jacket and above the same, a gas conductor leading from above the baffles, and an oil conductor connected to the lower portion of the tank.

6. In an oil and gas separator, a vertical tank, a jacket in the upper portion of the tank, there being a receiving space between the jacket and the tank sealed at its upper end, fluid inlets entering said space, means at the inlets for directing the influent circumferentially, vertical oil deflectors in said space directly in the path of said influent, baffles in the jacket and above the same, a gas conductor leading from above the baffles, and an oil conductor connected to the lower portion of the tank.

7. In an oil and gas separator, a vertical tank, a jacket in the upper portion of the tank, there being a receiving space between the jacket and the tank sealed at its upper end, fluid inlets entering said space, means at the inlets for directing the influent circumferentially, vertical oil deflectors in said space directly in the path of said influent, baffles in the jacket and above the same, a gas conductor leading from above the baffles, an oil conductor connected to the lower portion of the tank, and an automatically operated release valve in the oil conductor controlled by the level of the oil in the tank.

8. In an oil and gas separator, a vertical tank, a cylindrical tank jacket within and spaced from the side walls of the tank, said jacket being spaced a short distance below the top of the tank, a closure between the tank and the jacket at the top of the space therebetween, fluid inlets in the tank below the closure and adjacent thereto, oil deflectors in the path of the influent in said space and located between said inlets, baffles in the jacket, additional baffle in the space above the jacket and overlying the closure, a gas conductor extending from the space above the additional baffle to and through the lower portion of the tank, a pressure regulator in said conductor outside of the tank for maintaining a gas pressure in the tank, means for automatically maintaining an oil level in the tank and reducing the pressure area, and an oil conductor leading from the tank.

9. In an oil and gas separator, a vertical tank, a concentric jacket mounted in the tank, a circular space surrounding the jacket, fluid inlets in the tank wall for delivering fluid into said space, deflectors at said inlets directing the influent circumferentially in said space, angular deflectors secured to the tank wall in said space and extending transversely the major portion of said space for initially separating oil from the gas of the influent, transverse separating elements in said tank and jacket, a gas conductor leading from the tank and having its inlet above the baffles, and an oil outlet having a release valve for maintaining an oil level in the tank.

10. In an oil and gas separator, a vertical tank, a concentric jacket mounted in the tank, a circular space surrounding the jacket, fluid inlets in the tank wall, deflector boxes covering said inlet and discharging from one end only, angular deflectors in said space extending below the jacket for separating oil from the influent and conducting it to the lower portion of the tank, transverse separating elements in said tank and jacket, a gas conductor leading from the tank and having its inlet above the baffles, and an oil outlet having a release valve for maintaining an oil level in the tank.

11. In an oil and gas separator, a vertical tank, a cylindrical jacket mounted in the tank, a fluid entrance space surrounding the jacket in said tank, a plurality of transverse baffles in the jacket, drain pipes for said baffles leading down to the lower portion of the tank below the jacket, a top baffle extending transversely of the tank above the jacket and the space, a drain conductor for said top baffle leading to the lower portion of the tank, a gas conductor leading from above the top and out through the wall of the tank below the jacket, and an oil outlet at the bottom portion of the tank.

12. In an oil and gas separator, a vertical tank, a cylindrical jacket mounted in the tank, a fluid entrance space surrounding the jacket in said tank, a conical perforated baffle in the jacket, a drain pipe leading from the conical baffle, a helical baffle mounted in the jacket above the conical baffle, a trough contiguous to the jacket wall between the conical and helical baffles, a second drain pipe leading from the trough, a top conical baffle in the tank above the jacket and space, a second trough surrounding the upper end of the jacket, a drain from the top baffle to the second trough, a third drain pipe leading from the second trough, a gas conductor extending through the baffles and the side of the tank, and an oil conductor leading from the lower portion of the tank.

13. In an oil and gas separator, a vertical tank, a cylindrical jacket mounted in the tank, a fluid entrance space surrounding the jacket in said tank, a conical perforated bafflle in the jacket, a drain pipe leading from the conical baffle, a helical baffle mounted in the jacket above the conical baffle, a trough contiguous to the jacket wall between the conical and helical baffles, a second drain pipe leading from the trough, a top conical baffle in the tank above the jacket and space, a second trough surrounding the upper end of the jacket, a drain from the top baffle to the second trough, a third drain pipe leading from the second trough, a gas conductor extending through the baffles and the side of the tank, and an oil conductor leading from the lower portion of the tank, the conical baffles each having a plurality of openings each surrounded by a standing guard for preventing a liquid flowing back through the opening.

14. As a sub-combination in an oil and gas separator, a separating baffle for the tank, said baffle being conical in form and having a plurality of openings each surrounded by an upstanding guard flange, a drain conductor leading from the outside marginal portion of the baffle.

15. In an oil and gas separator, a vertical tank, a cylindrical jacket mounted within and spaced from the walls of the tank to provide a fluid entrance space therebetween, a plurality of transverse baffles in the jacket having their outer edges supported by the jacket and provided with drains, a top baffle extending transversely in the tank above and over the jacket and having a drain, baffles down through the lower portion of the tank, and an oil outlet at the lower portion of the tank.

In testimony whereof I affix my signature.

JAY P. WALKER.